J. P. HANDY.

STEERING WHEEL CONTROL.

APPLICATION FILED AUG. 7, 1915.

Reissued Mar. 18, 1919.

14,613.

2 SHEETS—SHEET 1.

Witnesses:

Jas. E. Hutchinson.

By

Inventor

John P. Handy

Calvin T. Williams, Attorney

J. P. HANDY.

STEERING WHEEL CONTROL.

APPLICATION FILED AUG. 7, 1915.

Reissued Mar. 18, 1919.

14,613.

2 SHEETS—SHEET 2.

Witnesses:

Jas. E. Hutchinson.

Inventor:

John P. Handy,

By Calvin V. Milams, Attorney.

THE NORRIS PETERS CO., PHOTO-LITHO., WASHINGTON, D. C.

UNITED STATES PATENT OFFICE.

JOHN PAUL HANDY, OF LONG PRAIRIE, MINNESOTA.

STEERING-WHEEL CONTROL.

14,613. Specification of Reissued Letters Patent. Reissued Mar. 18, 1919.

Original No. 1,132,771, dated March 23, 1915, Serial No. 740,756, filed January 8, 1913. Application for reissue filed August 7, 1915. Serial No. 44,321.

*To all whom it may concern:*

Be it known that I, JOHN P. HANDY, a citizen of the United States, residing in the city of Long Prairie, county of Todd, and State of Minnesota, have invented certain new and useful Improvements in Steering-Wheel Control, of which the following is a specification.

My invention relates to improvements in steering control for the front wheels of motorcycles, bicycles, etc., and more particularly to a mechanism of this character adapted to control the movement of the front wheel of the machine through the medium of the usual handle bar operatively associated therewith for steering purposes.

In carrying out the principle of the present invention, it is proposed to maintain the handle bar and steering wheel supports in substantially their normal relative positions as is at present customary in motor cycles of standard and approved types, and to interpose between the handle bar and steering wheel supports, novel differential mechanism whereby a rotatable movement of one of said members about an axis will result in a relatively less turning movement of the other of said members about substantially the same axis.

In the preferred embodiment of the invention illustrated, the steering mechanism is of a character simple in design and construction, pleasing in appearance, and the parts thereof are so constructed and arranged whereby they may be positioned substantially within the normal confines of the cycle parts, thereby offering substantially no protuberance, forwardly beyond the front bar of the cycle frame, or fork, with the result that the improved steering mechanism contemplated will be more effectively protected against damage or breakage.

A further feature of the invention includes novel supporting means for the differential mechanism interposed between the handle bar and steering wheel with means whereby this mechanism may be adjusted as desired to render more accurate the positioning of the parts of the steering mechanism and at the same time rendering the mechanism more accurate and efficient in operation.

More particularly, the invention includes a steering wheel fork or support, a handle bar, said support and handle bar being mounted for rotatable movement about substantially the same vertical axis, and differential mechanism interposed between the support and handle bar and offering substantially no obstruction forwardly beyond these parts, said mechanism being adapted, in the movement of the handle bar, to differentially move the steering wheel.

Other novel features and details in the construction and arrangement of parts will be appreciated from the description to follow, which for a clear understanding of the invention should be considered in connection with the accompanying drawings, and wherein is disclosed for the purpose of illustration, a convenient and satisfactory embodiment of the invention.

In the accompanying drawings forming part of this specification:—

With more particular reference to the drawings, A represents the framework of an ordinary motor cycle, the same being diagrammatically illustrated and broken away for the purpose of clearness.

2 is a front wheel journaled in the lower end of a fork 3, the fork head 4 having a suitable rotatable bearing or support in the front end of the frame.

Figure 1:
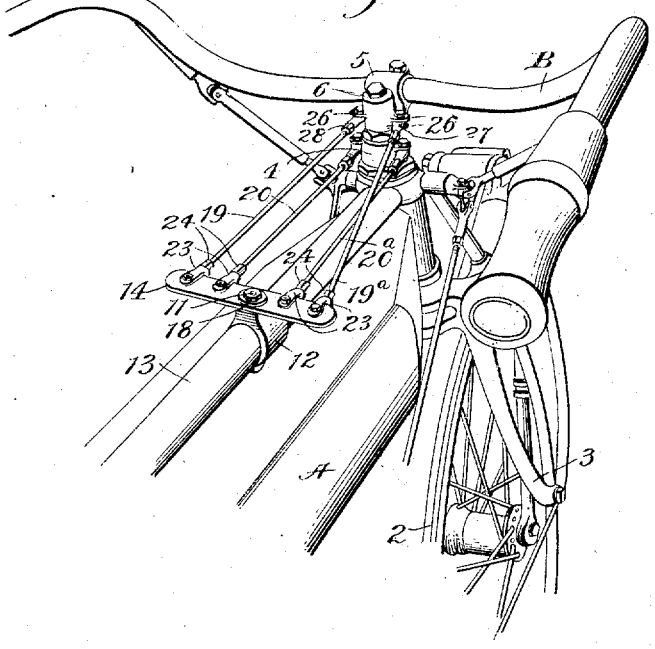
Figure 1 is a perspective view of the front end of a motor cycle fitted with my improvements.
Figure 2:
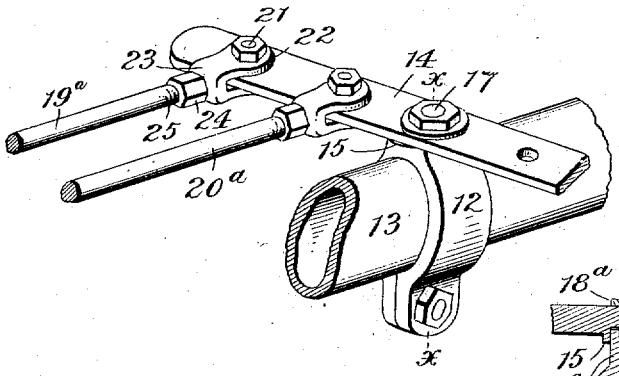
Fig. 2 is a detail view enlarged, and broken away of an equalizing bar forming part of the controlling mechanism.
Figure 4:
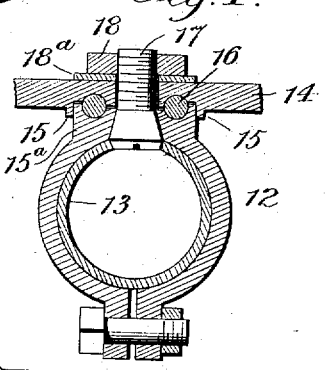
Fig. 4 is a section substantially on the line $x$—$x$ of Fig. 2.
Figure 3:
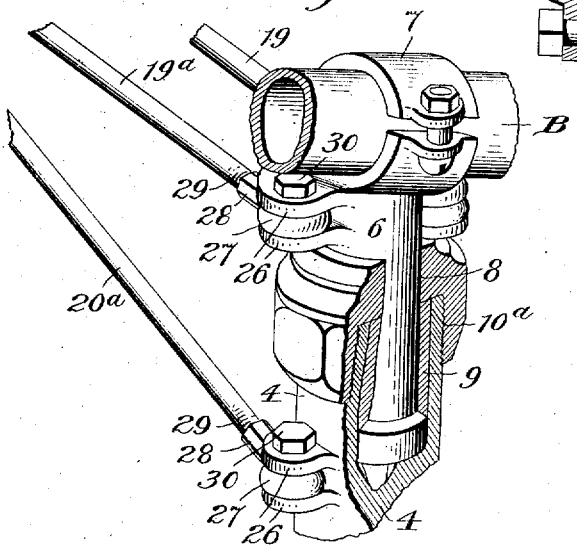
Fig. 3 is a detail perspective view enlarged and broken away, of the fork head and handle bar and connected controlling mechanism.

B represents an ordinary handle bar slidably supported in a split collar 5 forming the top of the post 6. The post 6, as shown in Fig. 3 is rotatably supported in the upper end of the fork head 4. As one method of securing the post 6 in the fork head, I show the post at its lower end formed with a surrounding flange 7 fitted in an opening 8 in the top of the fork head and secured in position by a sleeve 9 also fitted in the opening 8 above the flange 7. Over the top of the fork head and sleeved upon the post 6 is mounted a suitable crown collar having a screw threaded engagement 10ᵃ with the fork head, whereby the parts are held in place.

For the purpose of turning the fork head from the handle bar, I provide the following mechanism:—

Having pivotal support upon a collar 12 secured around the top bar 13 of the frame is a cross bar or equalizing bar 14. The cross bar is shown formed with a circumferential rib 15 extending downwardly around a suitable annular projection 15ᵃ at the top of the collar 12. Balls 16 are positioned between the cross bar and collar and fitted in registering annular runways therein. The cross bar is secured in position through the medium of a bolt 17 extending upwardly from the frame bar, a nut 18 being threaded upon the upper end of the bolt for securing these parts in place, and a washer 18ᵃ of any suitable construction being interposed between the nut 18 and cross bar 14. The outer ends of the cross bar are connected with the post of the handle bar by rods 19 and 19ᵃ, said rods having pivotal connection with said cross bar and post. The cross bar is also connected with the head of the fork by similar rods 20 and 20ᵃ offset inwardly, inside the rods 19 and 19ᵃ.

The means of connection between the various rods 19, 19ᵃ and 20, 20ᵃ and the cross bar 14 is similar and a description of one will suffice for the others. 21 is a bearing projecting through a suitable aperture in the cross bar 14 and of a length to extend above and below the cross bar 14, whereby to receive and constitute a pivotal bearing for the furcations 22 of a bifurcated bracket 23 which bracket has a tubular forward extension 24 interiorly threaded to receive the threaded terminal 25 of one of said rods 19, 19ᵃ, and 20, 20ᵃ. It will be appreciated that the bracket 23 is adapted for limited swinging movement about its bearing 21, and it will also be appreciated that by reason of the threaded connection between the connecting rods and said bracket, an adjustment between these parts may be readily accomplished, thereby taking up any unnecessary play, and affording an accurate adjustment for the differential mechanism.

The means of connection for the forward ends of the various connecting rods is similar, and it will be only necessary to describe one of these connections, it being noted however, that the supports for the connecting rods 19 and 19ᵃ are mounted upon the handle bar support whereas the connecting rods 20 and 20ᵃ are mounted upon the steering wheel support. 26 are vertically spaced apertured lugs or ears adapted to receive therebetween a headed end 27 of a bracket which is also apertured and has an interiorly threaded rearwardly extending tubular part 28 to be engaged by the threaded terminal 29 of one of the connecting rods. 30 is a suitable bearing passing through the registering apertures in the lugs 26 and apertured end 27 of the supporting bracket. By reason of the threaded connection at this end of the connecting rod, a still more accurate adjustment of the connecting rod is made possible.

In operation, when the handle bar is turned, in steering the machine, the fork head and supported front wheel will be similarly turned through the medium of the cross bar and connecting rods, but at a different speed or for a different distance. By reason of the rods 20 and 20ᵃ being positioned closer to the fulcrum of the cross bar than the rods 19 and 19ᵃ, it will be evident that there will be less turning of the fork head than of the handle bar. It thus becomes easier to steer the front wheel, particularly where the same is being driven through sand, etc., than in the ordinary construction, where the fork head is turned directly from the handle bar.

It will be seen that the handle bar and steering wheel supports are adapted for rotatable movement substantially in alinement with one another or about the same axis with the result that the interposition of the novel differential mechanism contemplated herein does not make necessary a change in the normal relative position of these parts in standard cycles now in use. It will further be observed that the differential mechanism having an anchorage or support rearwardly of the handle bars, the same offers substantially no obstruction forwardly beyond the front end of the cycle frame parts, which might interfere with the lighting and other fixtures of the machine. This arrangement also affords protection for the differential mechanism in the use of the machine, which if the same projected forwardly beyond the confines of the machine would have a greater tendency to become damaged or broken in the event of accident.

What is claimed is:

1. In a machine of the class described, comprising a frame, a steering wheel and handle bar, means for controlling the steering wheel from the handle bar, comprising independent rotatable supports for the steering wheel and handle bar in alinement with each other, a leverage connection between the handle bar and steering wheel supports, and intermediate anchorage for said connection upon the frame of the machine back of the handle bar.

2. In combination with a machine of the class described, comprising a frame, steering wheel, and handle bar, means for controlling the steering wheel from the handle bar, comprising independent rotatable supports for the steering wheel and handle bar, an equalizing cross bar supported by the frame, and leverage connections between said cross bar and said handle bar and steering wheel supports.

3. In combination with a machine of the class described, comprising a frame, a steering wheel, and handle bar, means for controlling the steering wheel from the handle bar, comprising independent rotatable supports for the wheel and handle bar, a cross bar fulcrumed upon the frame, and relatively offset connections between said cross bar and steering wheel and handle bar supports.

4. In combination with a machine of the class described, comprising a frame, a steering wheel, and handle bar, independent rotatable supports for said steering wheel and handle bar, a cross bar fulcrumed upon the frame at the rear of the handle bar, connections between the outer ends of the cross bar and handle bar support, and connections between said cross bar and steering wheel support inwardly offset from said first mentioned connections.

5. In a machine of the character described, the combination of a frame, a steering wheel, a handle bar, said steering wheel and handle bar being mounted for rotatable movement about substantially the same vertical axis, and means for controlling the steering wheel from the handle bar comprising levers projecting rearwardly from these members, means for connecting the levers for simultaneous movement, and said connection offering substantially no obstruction forwardly beyond the frame of the machine.

6. In a machine of the character described, the combination of a frame, a steering wheel, a handle bar, and means for controlling the steering wheel from the handle bar comprising independent rotatable supports for the steering wheel and handle bar in alinement with each other, a leverage connection between the handle bar and steering wheel supports, an intermediate anchorage for said connection arranged at a point rearwardly of the handle bar.

7. In a machine of the character described, the combination of a frame, a steering wheel, a handle bar, said steering wheel and handle bar being adapted to rotate about a common axis, an equalizing bar disposed rearwardly of the handle bar, and leverage connection between said equalizing bar and said handle bar and steering wheel.

8. In a machine of the character described, the combination of a frame, a steering wheel, a handle bar, said steering wheel and handle bar being supported whereby to rotate about a common axis, levers projecting rearwardly from both the handle bar and steering wheel supports, and a movable connection between said levers and the frame of the machine.

9. In a machine of the character described, the combination of a frame, a steering wheel, a handle bar, supports for the steering wheel and handle bar permitting these parts to rotate relative to one another about a substantially common axis, rods extending rearwardly from the handle bar support and from the steering wheel support, and a connecting bar to which said rods are adjustably connected.

10. In a machine of the character described, the combination of a frame, a steering wheel, a handle bar, supports for the steering wheel and handle bar permitting these parts to rotate relative to one another, a differential connection between said supports, said connection including lengthwise adjustable operatively connected lever bars.

11. In a machine of the character described, the combination of a frame, a steering wheel, a handle bar, said steering wheel and handle bar being supported whereby to rotate about a common axis, and adjustably connected means interposed between the handle bar and steering wheel whereby a movement of one of these parts will result in a differential movement of the other part, said means being adjustable.

JOHN PAUL HANDY.

Witnesses:
A. J. Rhoda,
Byron C. Koonze.

Copies of this patent may be obtained for five cents each, by addressing the "Commissioner of Patents, Washington, D. C."